United States Patent [19]
Mathias

[11] 3,871,493
[45] Mar. 18, 1975

[54] SHOE DRUM BRAKES
[75] Inventor: Christopher Neil Mathias, Birmingham, England
[73] Assignee: Girling Limited, Birmingham, England
[22] Filed: Oct. 26, 1973
[21] Appl. No.: 409,808

[30] Foreign Application Priority Data
Dec. 21, 1972 Great Britain.................. 59284/72

[52] U.S. Cl................. 188/78, 74/526, 188/2 D, 188/325, 192/75, 192/99 B
[51] Int. Cl............................................. F16d 51/00
[58] Field of Search............ 188/2 D, 78, 323–337, 188/343, 106 A, 106 F, 106 R, 79.5 K, 79.5 P; 74/526; 192/75, 99 B

[56] References Cited
UNITED STATES PATENTS
| | | | |
|---|---|---|---|
| 2,418,848 | 4/1947 | Perrot | 188/78 |
| 2,469,826 | 5/1949 | Irving | 188/78 |
| 2,758,680 | 8/1956 | Rabe | 188/78 X |

FOREIGN PATENTS OR APPLICATIONS
1,194,091  5/1959  France................. 188/78

Primary Examiner—George E. A. Halvosa
Attorney, Agent, or Firm—Scrivener Parker Scrivener and Clarke

[57] ABSTRACT

A vehicle internal shoe drum brake comprises a pair of brake shoes mounted on a brake back plate, and a brake actuator having a lever connected at one end to one of the shoes and being pivotable about a point intermediate its ends. A stop member forms a releasable pivotal connection between a brake applying cable and the other end of the lever and engages an abutment, preferably an extension of the back plate, to hold the lever in a retracted position spaced from a fully retracted position, release of the pivotal connection permitting the shoes to be retracted.

6 Claims, 2 Drawing Figures

SHOE DRUM BRAKES

This invention relates to internal shoe drum brakes for vehicle wheels of the kind, comprising a pair of arcuate brake shoes carrying friction linings, the shoes being movably mounted on a fixed member, for example a brake back plate, for engagement with a rotatable brake drum, and a mechanical actuator comprising a lever pivotally connected at one end to one of the shoes and at its other end to brake applying means, for example a cable, the lever being pivotable about a point intermediate its ends. Such brakes will hereinafter be referrred to as "of the kind set forth."

In known brakes of the kind set forth, after a long period of use one or both of the shoes may wear a groove in the drum and the adjusting means may move the shoes apart to compensate for wear of the linings until the shoes lie within the groove in their normal retracted positions. When this occurs, it is often impossible to remove the drum, which is effectively keyed against axial movement relative to the fixed member.

To ensure that the drum can be removed, it is known to provide a stop member positioned between the fixed member and the movable lever and removably attached to either the fixed member or the lever to prevent the shoes retracting fully during normal operation. The stop member is accessible from the exterior of the brake and when it is removed the shoes can retract further to bring them from within the groove in the drum and allow the drum to be removed. Normally the brake applying means also has to be released to permit the further retractable movement of the lever and the shoes. The provision of such a stop member thus has the disadvantage that two separate operations, release of the stop and of the brake applying means are required to allow removal of the drum.

In accordance with the invention, there is provided an internal shoe drum brake of the kind set forth, comprising a stop member forming a releasable pivoted connection between the lever and the brake applying means and engaging a fixed abutment member to hold the lever in a first retracted position spaced from a second position of greater retraction.

Release of the connection both effects uncoupling of the brake applying means from the lever and permits disengagement of the stop member from the fixed abutment to allow retracting movement of the shoes.

Preferably, the stop member is connected directly to the brake applying means and is releasably and pivotally connected to the said other end of the lever, for example by a removable pivot pin.

The fixed abutment member may be an extension of the fixed member, and preferably one end of the stop member abuts the abutment member and is rounded to permit angular movement of the stop member.

One form of internal shoe drum brake for a vehicle wheel will now be described by way of example, with reference to the accompanying drawings, in which.

Figure 1:
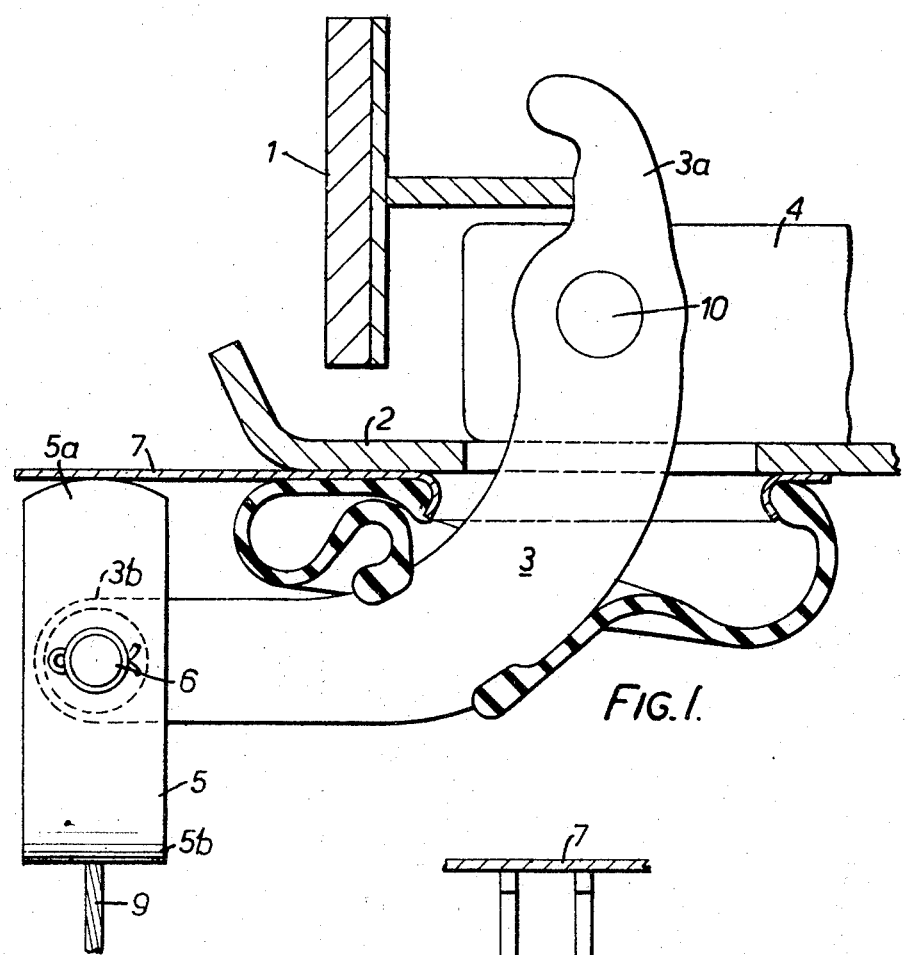
FIG. 1 shows diagrammatically part of a wheel brake partially in section.
Figure 2:
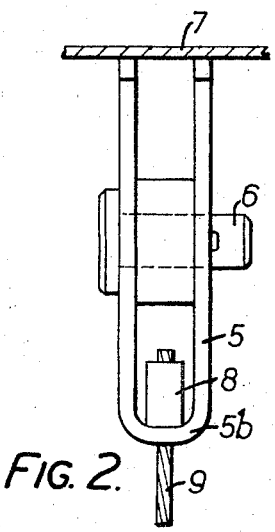
FIG. 2 is a side view of a stop member shown in FIG. 1.

The sheel brake comprises a pair of shoes 1 (only one of which is shown) movably mounted on a fixed back plate 2 for engagement with a rotatable brake drum (not shown), a pair of shoe return springs (also not shown) being connected between the shoes 1. A service brake actuator assembly (not shown) is arranged between one pair of adjacent ends of the shoes, and an automatic adjusting assembly (not shown) for automatically adjusting the gap between the shoes 1 and the brake drum to compensate for wear is incorporated in known manner in a strut (not shown) arranged between the shoes adjacent the actuator assembly. An L-shaped lever 3 extends through an opening in the back plate 2 and engages at one end 3a one of the shoes 1. A strut 4 acting on the other shoe is pivotally connected to the lever 3 at point 10 intermediate its ends.

A stop member in the form of a clevis 5 is pivotally mounted intermediate its ends to the other end 3b of the lever 3 by a movable clevis pin 6. One end 5a of the clevis is curved and abuts a fixed abutment plate 7, which is an extension of the back plate 2. The other end 5b of the clevis receives a nipple 8 of a hand brake actuating cable 9.

In normal operation of the brake, tensioning of the cable 9 moves the clevis 5 away from the plate 7 and causes the lever 3 to move the shoes 1 apart to apply the brake in the usual manner. Upon release of the cable 9, the parts return to the retacted position shown in FIG. 1.

If, after a long period of use, the shoes have formed a groove in the brake drum and the adjusting assembly has moved the shoes apart to compensate for wear so that they lie within the groove in their retracted positions, then the drum will be difficult or impossible to remove. By removing the clevis pin 6, the cable 9 is disconnected from the lever 3 and the lever can rotate (clockwise as seen in FIG. 1) to its fully retracted position in which its end 3b abuts the plate 7. The shoes 1 will then be removed by the bias of the return springs out of the groove to permit the drum to be removed.

It will be appreciated that the clevis 5 is rounded at the end 5a which engages the plate 7 to permit angular movement of the clevis. Preferably, the curve has a centre of curvature coincident with the centre of clevis pin 6 so that the same effective distance is maintained between the end 3b of the lever 4 and the plate 6 during normal operation.

I claim:

1. In an internal shoe drum brake for a vehicle wheel, comprising a fixed member, a rotatable brake drum, a pair of arcuate brake shoes mounted on the fixed member and having friction linings for engagement with the brake drum, a mechanical actuator comprising an angularly movable lever being pivotable about a point intermediate its ends between a brake applied position and a retracted position wherein the brakes are released and having one end pivotally connected to one of said shoes, and brake applying means pivotally connected to the other end of said lever, the improvement comprising a stop member forming a releasable pivotal connection between said lever and said brake applying means, and an abutment member engaged by said stop member to hold said lever in a first retracted position spaced from a second position of greater retraction.

2. A brake according to claim 1, wherein said stop member is connected directly to said brake applying means and is releasably pivotally, connected directly to said other end of said lever.

3. A brake according to claim 1, wherein one end of said stop member is rounded and abuts said abutment member to permit angular movement of the stop member.

4. A brake according to claim 1, wherein one end of said stop member engages said abutment member and the other end is connected directly to said brake applying means, and wherein said lever is connected to said stop member intermediate the ends of the latter.

5. A brake according to claim 1, wherein said abutment member is an extension of said fixed member.

6. A brake according to claim 1, further comprising a movable strut acting on the other of said brake shoes wherein said lever is pivotally connected to said strut at said point intermediate the ends of said lever.

* * * * *